US008251450B2

(12) United States Patent
Carroll et al.

(10) Patent No.: US 8,251,450 B2
(45) Date of Patent: Aug. 28, 2012

(54) SECOND ROW FRONT TUMBLE HOOK PROTECTION

(75) Inventors: Jeffrey P. Carroll, West Bloomfield, MI (US); Peter Paul Zeimis, III, Shelby Township, MI (US); Matthew J. McLaughlin, Chesterfield Township, MI (US)

(73) Assignee: Intier Automotive Inc, Aurora (CA)

( * ) Notice: Subject to any disclaimer, the term of this patent is extended or adjusted under 35 U.S.C. 154(b) by 179 days.

(21) Appl. No.: 12/922,556

(22) PCT Filed: Mar. 16, 2009

(86) PCT No.: PCT/CA2009/000330
§ 371 (c)(1),
(2), (4) Date: Sep. 14, 2010

(87) PCT Pub. No.: WO2009/114938
PCT Pub. Date: Sep. 24, 2009

(65) Prior Publication Data
US 2011/0006574 A1    Jan. 13, 2011

(51) Int. Cl.
*B60N 2/00* (2006.01)
*B60N 2/005* (2006.01)
*B60N 2/02* (2006.01)
*B60N 2/30* (2006.01)
*B60N 2/36* (2006.01)
(52) U.S. Cl. ......... 297/334; 297/331; 297/335; 297/336
(58) Field of Classification Search .................. 297/331, 297/332, 334, 335, 336
See application file for complete search history.

(56) References Cited

U.S. PATENT DOCUMENTS

| 5,240,302 | A | | 8/1993 | Yoshida et al. |
| 5,588,707 | A | * | 12/1996 | Bolsworth et al. ......... 297/334 X |
| 5,671,948 | A | * | 9/1997 | Susko et al. ............... 297/335 X |
| 6,000,742 | A | | 12/1999 | Schaefer et al. |
| 6,135,555 | A | | 10/2000 | Liu et al. |
| 6,174,017 | B1 | | 1/2001 | Salani et al. |
| 6,293,603 | B1 | * | 9/2001 | Waku et al. ............... 297/334 X |
| 6,375,245 | B1 | * | 4/2002 | Seibold et al. ............ 297/336 X |
| 6,523,899 | B1 | | 2/2003 | Tame |
| 6,578,919 | B2 | * | 6/2003 | Seibold et al. ................. 297/331 |
| 6,595,588 | B2 | * | 7/2003 | Ellerich et al. ................ 297/331 |
| 6,601,900 | B1 | * | 8/2003 | Seibold ..................... 297/334 X |
| 6,644,730 | B2 | * | 11/2003 | Sugiura et al. ............ 297/331 X |
| 6,655,738 | B2 | * | 12/2003 | Kammerer .................... 297/331 |

(Continued)

FOREIGN PATENT DOCUMENTS
EP    0925995 B1    12/2004
(Continued)

*Primary Examiner* — Rodney B White
(74) *Attorney, Agent, or Firm* — Miller Canfield

(57) ABSTRACT

A seat assembly includes a seat back pivotally coupled to a seat cushion. A front leg is pivotally coupled between the cushion and a floor for providing pivotal movement of the seat cushion between a seating position and a kneel position. A front link is pivotally coupled to the cushion and includes a hook for selectively engaging a striker mounted to the floor. A seat back bracket includes an upper portion operatively coupled to the seat back allowing pivotal movement of the seat back between upright and folded positions, and a lower portion releasably coupled to the floor. The hook is engaged with the striker in the seating position to secure the seat assembly to the floor and released from the striker in response to moving the seat cushion to the kneel position to allow pivotal movement of the seat cushion between the kneel position and a tumble position.

12 Claims, 9 Drawing Sheets

U.S. PATENT DOCUMENTS

| | | | |
|---|---|---|---|
| 6,729,689 B2 * | 5/2004 | Habedank | 297/335 |
| 6,817,669 B2 * | 11/2004 | Roth et al. | 297/334 X |
| 6,860,562 B2 | 3/2005 | Bonk | |
| 6,902,236 B2 * | 6/2005 | Tame | 297/335 |
| 6,932,409 B2 | 8/2005 | Falchero et al. | |
| 6,964,452 B2 * | 11/2005 | Kammerer | 297/331 |
| 6,991,293 B2 * | 1/2006 | Lang et al. | 297/336 |
| 7,014,263 B2 * | 3/2006 | Mukoujima et al. | 297/334 X |
| 7,040,684 B2 * | 5/2006 | Tame et al. | 297/331 X |
| 7,048,330 B2 * | 5/2006 | Daniel | 297/336 X |
| 7,121,609 B2 * | 10/2006 | Tame | 297/336 X |
| 7,121,624 B2 | 10/2006 | Pejathaya et al. | |
| 7,134,725 B2 * | 11/2006 | Hofmann et al. | 297/334 X |
| 7,165,801 B2 * | 1/2007 | Tame et al. | 297/335 X |
| 7,213,861 B2 * | 5/2007 | Yokoyama et al. | 297/331 X |
| 7,267,406 B2 * | 9/2007 | Sturt | 297/331 X |
| 7,300,107 B2 * | 11/2007 | Kammerer | 297/336 |
| 7,306,278 B2 * | 12/2007 | Holdampf | 297/334 X |
| 7,328,929 B2 * | 2/2008 | Epaud | 297/331 X |
| 7,377,582 B2 * | 5/2008 | Fukada et al. | 297/331 X |
| 7,401,857 B2 * | 7/2008 | Laux | 297/331 X |
| 7,413,251 B2 * | 8/2008 | Link | 297/334 |
| 7,497,517 B2 * | 3/2009 | Gundall et al. | 297/334 |
| 7,568,764 B2 * | 8/2009 | Harper et al. | 297/331 |
| 7,686,389 B2 * | 3/2010 | Yamada | 297/331 X |
| 7,686,397 B2 * | 3/2010 | Sahi | 297/334 |
| 7,695,058 B2 * | 4/2010 | Satta et al. | 297/331 X |
| 7,758,123 B2 * | 7/2010 | Picker et al. | 297/336 |
| 7,784,860 B2 * | 8/2010 | Schacht et al. | 297/331 X |
| 7,878,592 B2 * | 2/2011 | Yamada et al. | 297/334 |
| 8,038,206 B2 * | 10/2011 | Ito et al. | 297/331 X |
| 8,047,610 B2 * | 11/2011 | Yamagishi | 297/334 X |
| 8,066,326 B2 * | 11/2011 | Hurst et al. | 297/334 X |
| 8,096,616 B2 * | 1/2012 | Ventura et al. | 297/334 |
| 8,123,272 B2 * | 2/2012 | Ito et al. | 297/335 X |
| 2006/0103174 A1 * | 5/2006 | Queveau et al. | 297/331 X |
| 2006/0113828 A1 | 6/2006 | Ryan et al. | 297/336 |
| 2006/0273645 A1 * | 12/2006 | Ferrari et al. | 297/336 |
| 2008/0203796 A1 | 8/2008 | Picker et al. | |

FOREIGN PATENT DOCUMENTS

JP  8067187 A  3/1996

* cited by examiner

SECOND ROW FRONT TUMBLE HOOK PROTECTION

BACKGROUND OF THE INVENTION

1. Field of the Invention

The invention relates to a seat assembly for an automotive vehicle, and more particularly, to a seat assembly that is movable between a seating position, a kneel position, and a tumble position.

2. Description of Related Art

Certain mini-van and sport utility vehicles are provided with second and third row seating for supporting seat occupants above a vehicle floor. It is common that a seat assembly of such second and third row seating is movable between a seating position and a stowed or kneel position in order to increase the amount of available cargo space within the vehicle. As the seat assembly moves from the seating position to the kneel position, a seat back is folded forwardly from a generally vertical position to a fold flat position overlying a seat cushion. At the same time, the seat cushion is moved forward and downward from a raised position spaced above the floor to a lowered position resting along the floor. Thus, when the seat assembly is in the kneel position a back side of the seat back is generally horizontal and defines a load floor surface.

Alternatively, it is common that a second or third row seat assembly is movable between the seating position and a tumble position in order to provide access to an area behind the seat assembly. In order to move the seat assembly from the seating position to the tumble position, the seat back is first folded forwardly from the generally vertical position to the fold flat position overlying the seat cushion. Next, the seat assembly is rotated about a pivot point at a lower front edge of the seat cushion approximately ninety degrees (90°) until the seat back and seat cushion are substantially upright. In the tumble position a rearward end of the seat cushion is positioned above the forward end of the seat cushion.

It is desirable to provide a seat assembly that moves between a seating position and a kneel position and also moves between the kneel position and a tumble position. It is also desirable to provide a seat assembly that moves between a seating position and a kneel position about a first pivot and moves between the kneel position and a tumble position about a second pivot.

SUMMARY OF THE INVENTION

According to one aspect of the invention, a seat assembly includes a seat cushion extending between forward and rearward ends and a seat back pivotally coupled to the rearward end of the seat cushion. A front leg is pivotally coupled between the forward end of the seat cushion and the floor defining an upper pivot axis and a lower pivot axis. The seat cushion is movable between a generally horizontal seating position, a generally horizontal kneel position that is disposed forward and downward of the seating position, and a generally vertical tumble position wherein the rearward end of the seat cushion is disposed above the forward end. A front link extends between an upper end pivotally coupled to the forward end of the seat cushion and a lower end having a hook that is adapted for selective engagement with a striker mounted to the floor. A seat back bracket extends between an upper portion and a lower portion. The upper portion is operatively coupled to the seat back for allowing selective pivotal movement of the seat back between a generally upright position and a forwardly folded position. The lower portion is releasably coupled to the floor. The hook of the front link is engaged with the striker in the seating position and released from the striker in response to moving the seat back between the upright position and the folded position to allow pivotal movement of the seat cushion about the upper pivot axis between the kneel position and the tumble position.

BRIEF DESCRIPTION OF THE DRAWINGS

Other advantages of the present invention will be readily appreciated as the same becomes better understood by reference to the following detailed description when considered in connection with the accompanying drawings, wherein.

DETAILED DESCRIPTION OF THE EMBODIMENTS

Figure 1:
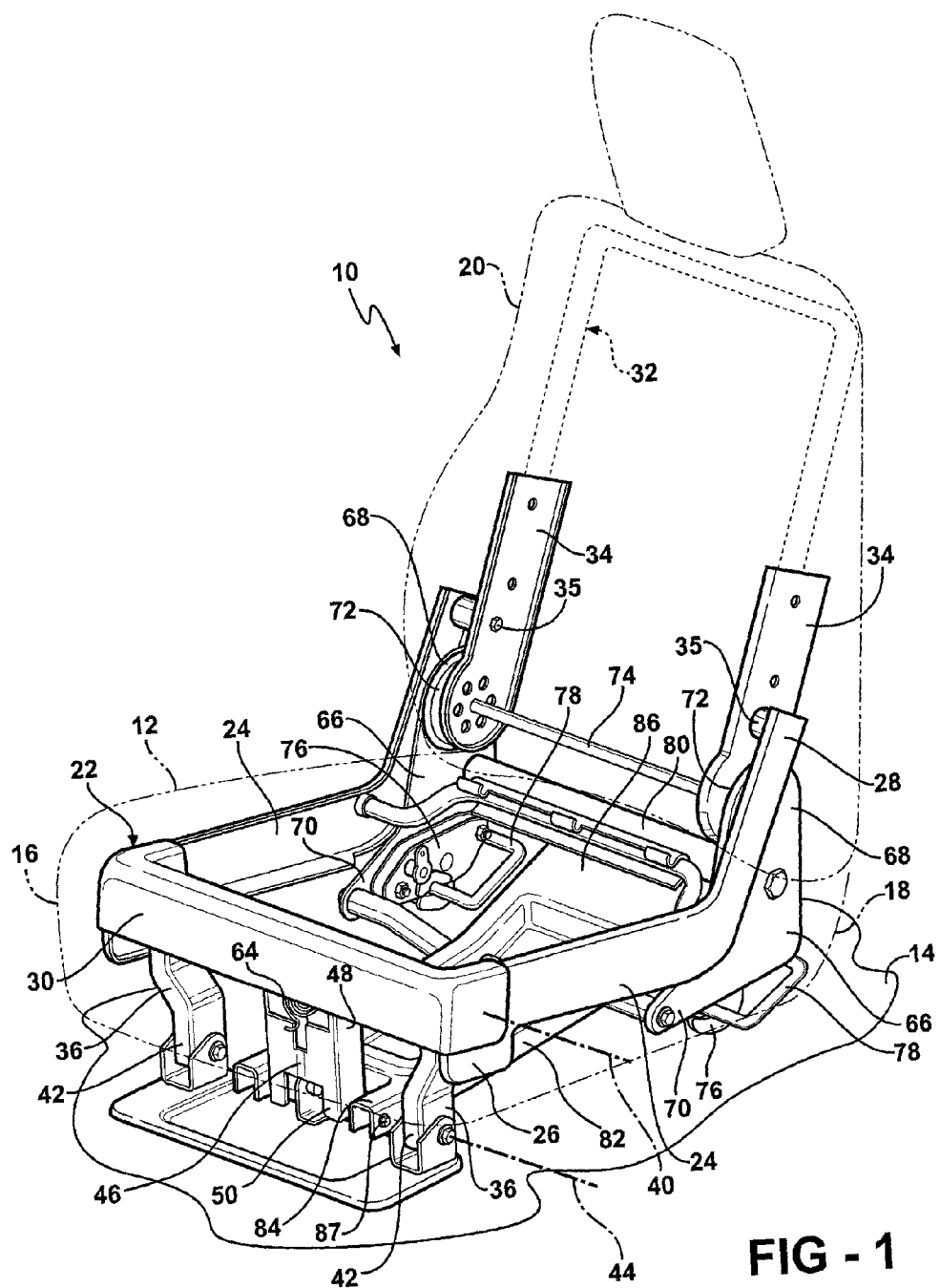
FIG. 1 is a perspective view of a seat assembly in a seating position according to the invention.

Referring to the Figures, wherein like numerals indicate like or corresponding parts throughout the several views, a seat assembly for use in an automotive vehicle is generally shown at 10. The seat assembly 10 includes a seat cushion 12 for supporting a seat occupant above a floor 14 of the vehicle. The seat cushion 12 extends between a forward end 16 and a rearward end 18. The seat assembly 10 also includes a seat back 20 operatively coupled to the rearward end 18 of the seat cushion 12 for supporting a back of the seat occupant.

Figure 2:
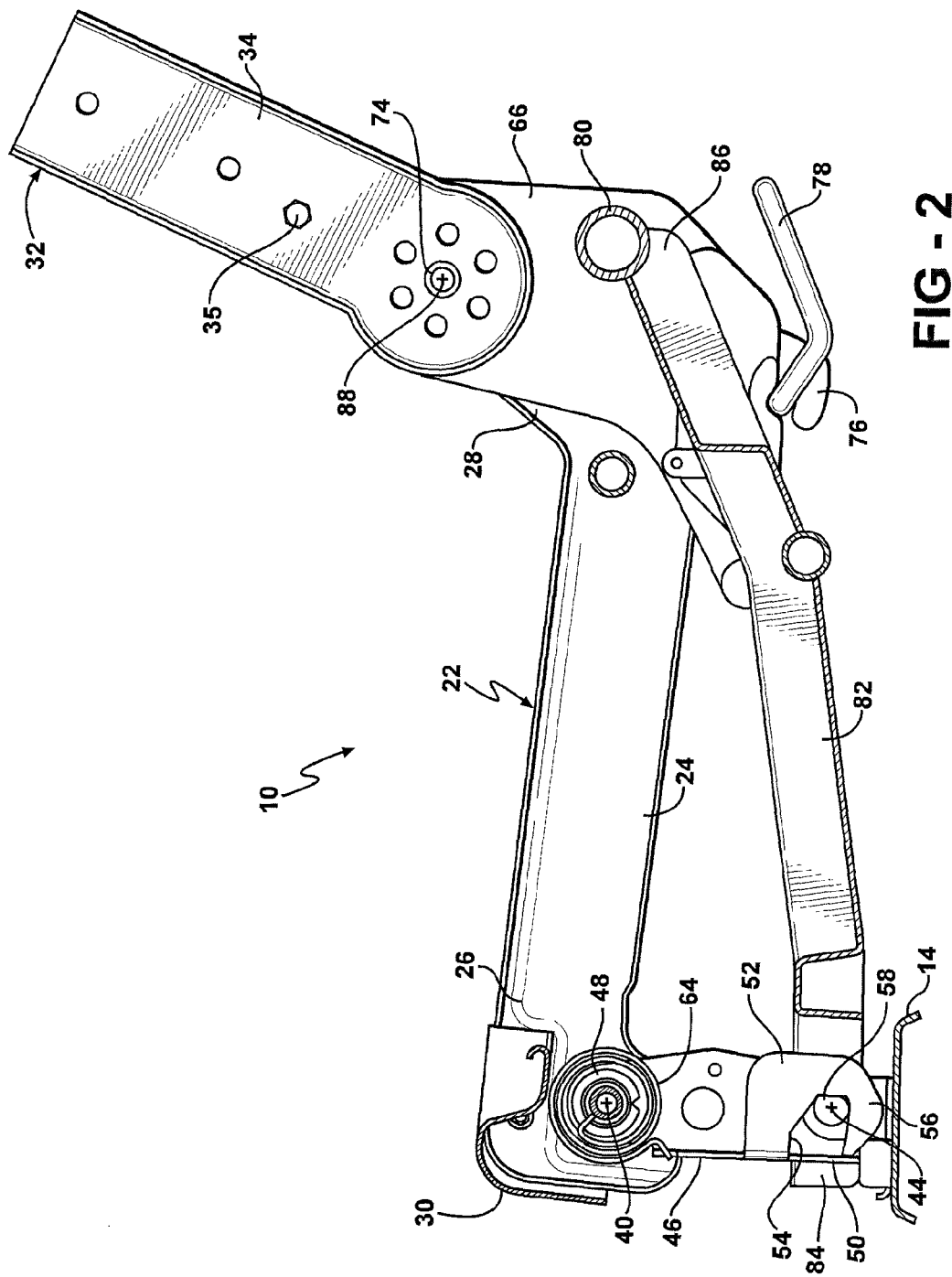
FIG. 2 is a fragmentary, cross-sectional side view of the seat assembly in the seating position.
Figure 3:
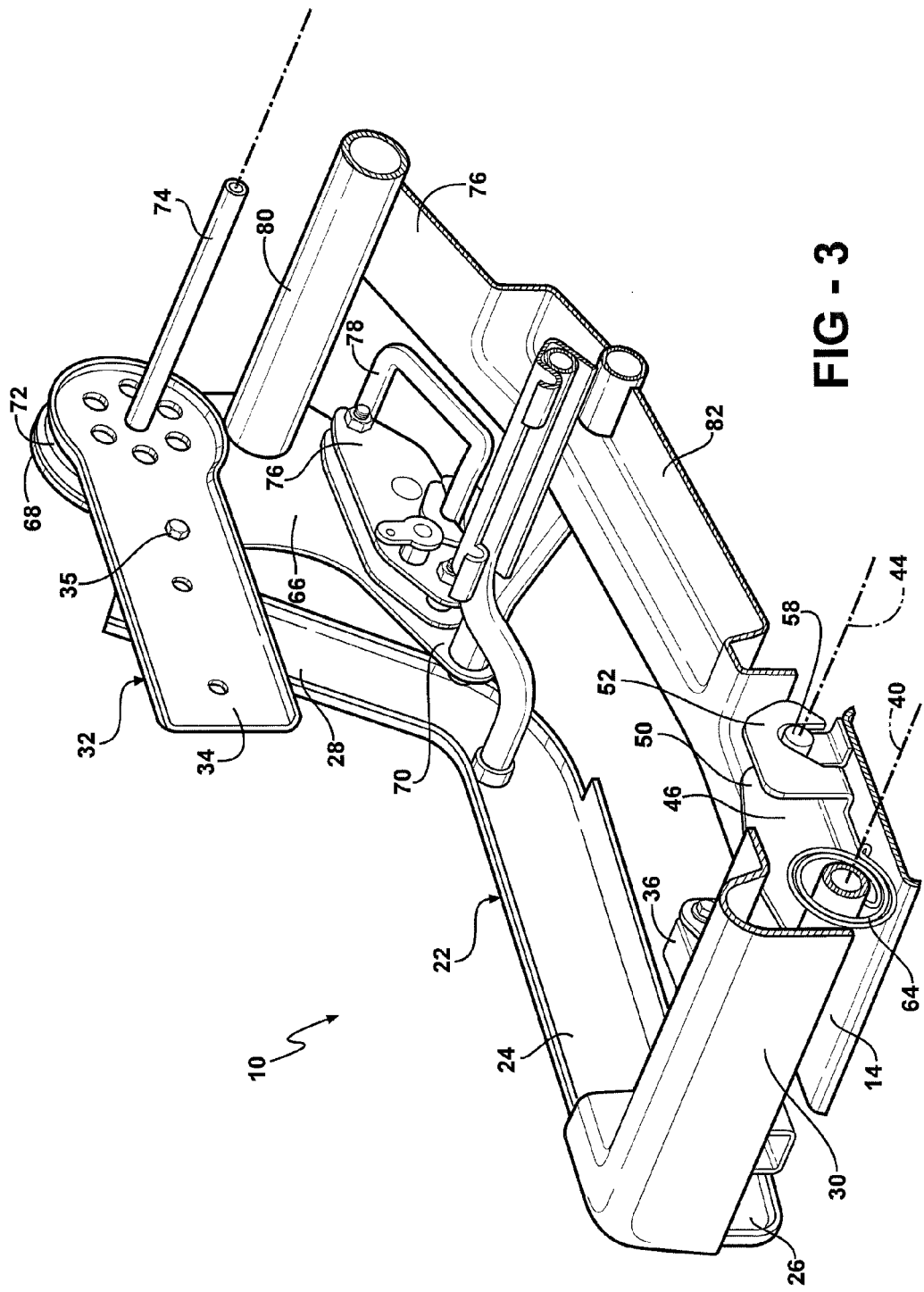
FIG. 3 is a fragmentary, cross-sectional perspective view of the seat assembly in a kneel position.
Figure 4:
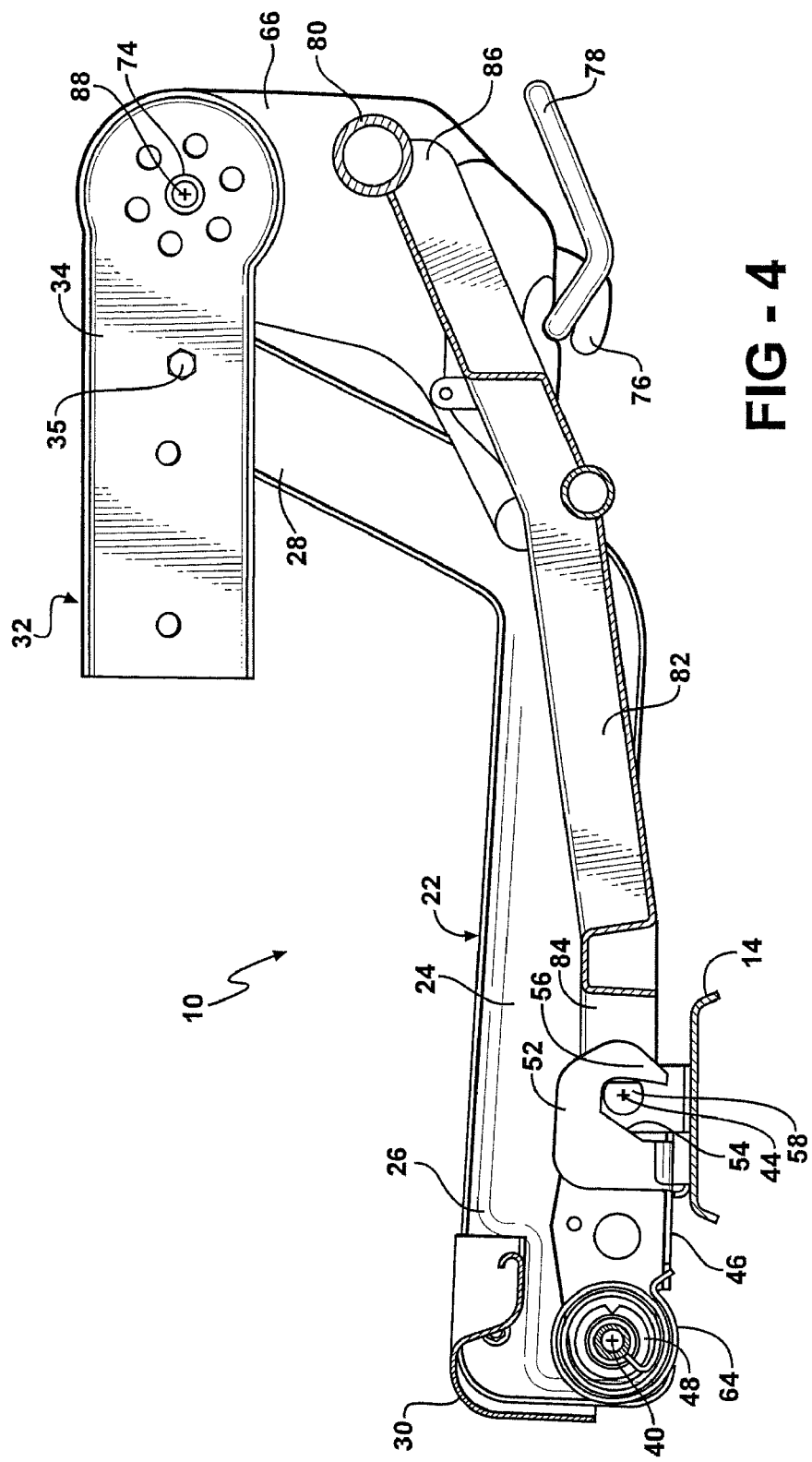
FIG. 4 is a fragmentary, cross-sectional side view of the seat assembly in the kneel position.
Figure 5:
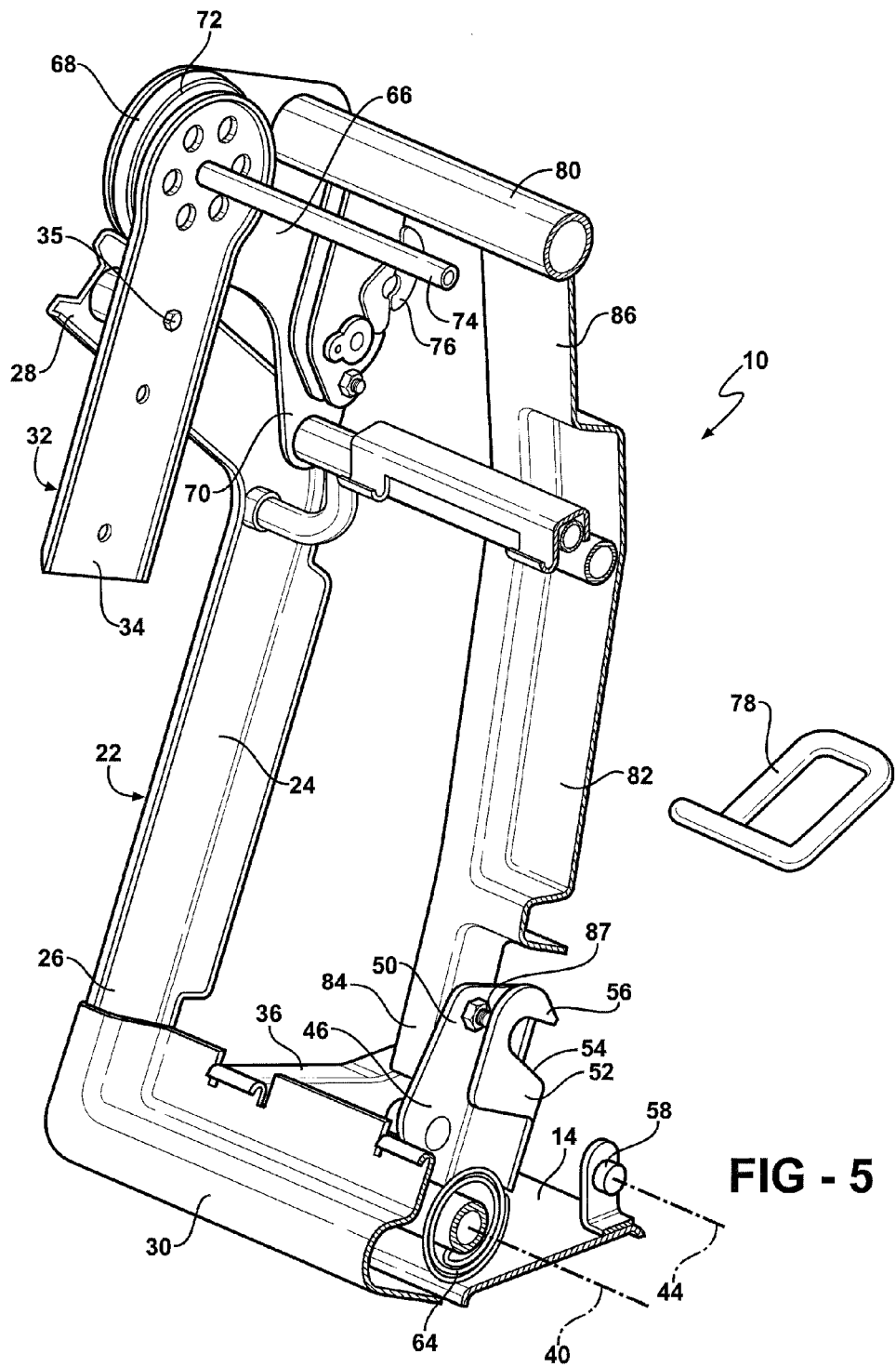
FIG. 5 is a fragmentary, cross-sectional perspective view of the seat assembly in a tumble position.
Figure 6:
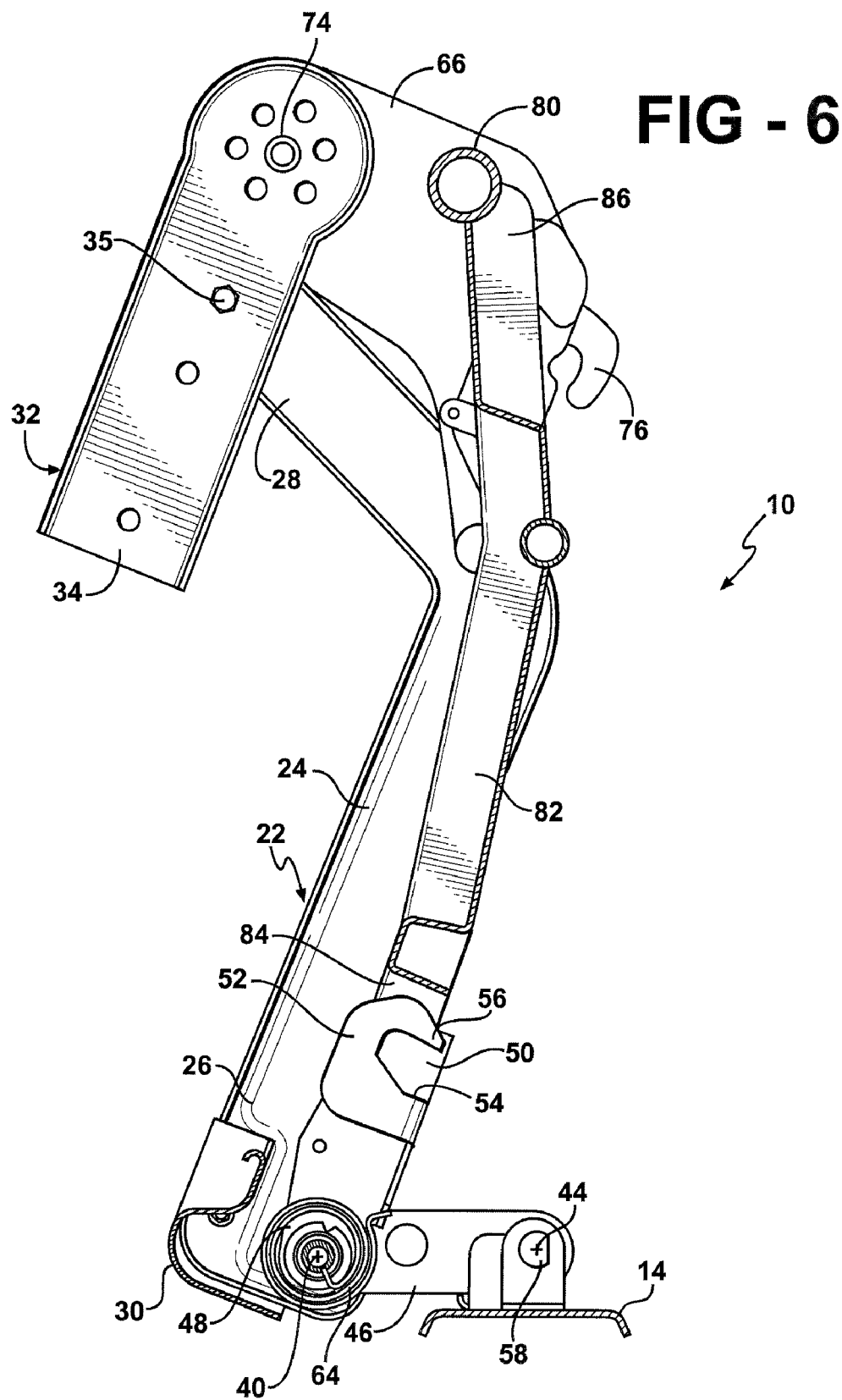
FIG. 6 is a fragmentary, cross-sectional side view of the seat assembly in the tumble position.

The seat assembly 10 is movable between a seating position, a kneel position, and a tumble position. The seating position is shown in FIGS. 1 and 2. In the seating position, the seat cushion 12 is in a generally horizontal raised position that is spaced above the floor 14 and the seat back 20 is in a generally upright or vertical position. The kneel position is shown in FIGS. 3 and 4. In the kneel position, the seat cushion 12 is in a generally horizontal lowered position, lying adjacent the floor 14, and the seat back 20 is in a forwardly folded position, overlying the seat cushion 12. The tumble position is shown in FIGS. 5 and 6. In the tumble position, the seat cushion 12 is in a generally vertical position such that the rearward end 18 is positioned above the forward end 16 and the seat back 20 is in the forwardly folded position.

The seat cushion 12 includes a seat cushion frame, generally indicated at 22, supporting a resilient contoured foam pad (not shown) that is encased by a fabric trim cover (not shown), as is commonly known in the vehicle seating art. The seat cushion frame 22 includes a pair of laterally spaced apart side members 24 that are generally L-shaped. Each side member 24 extends between a first end 26 adjacent the forward end 16 of the seat cushion 12 and a second end 28 adjacent the rearward end 18 of the seat cushion 12. The seat cushion frame 22 also includes a front member 30 extending between the first ends 26 of the side members 24.

The seat back 20 includes a seat back frame, generally indicated at 32, supporting a resilient contoured foam pad (not shown) that is encased by a fabric trim cover (not shown), as is commonly known in the vehicle seating art. The seat back frame 32 includes a pair of laterally spaced apart side members 34. The second end 28 of each side member 24 of the seat cushion frame 22 is pivotally coupled to the corresponding side member 34 of the seat back frame 32 at 35, thereby supporting the rearward end 18 of the seat cushion 12. The purpose of the pivotal connection between the seat cushion frame 22 and the seat back frame 32 will be apparent below.

A pair of laterally spaced apart outer front legs 36 are pivotally coupled between the forward end 16 of the seat cushion 12 and the floor 14. More specifically, each front leg 36 extends between an upper end 38 that is pivotally coupled to the first end 26 of one of the side members 24, defining a laterally extending first pivot axis 40, and a lower end 42 that is adapted to be pivotally coupled to the floor 14, defining a laterally extending second pivot axis 44.

An inner front link 46 is disposed between the pair of spaced apart outer front legs 36. The inner front link 46 extends between an upper end 48 that is pivotally coupled to the front member 30 of the seat cushion frame 22 and a lower end 50 that incorporates a rigid hook 52. The pivotal connection between the upper end 48 of the inner front link 46 and the front member 30 defines a laterally extending axis that is coaxial with the first pivot axis 40. The hook 52 includes a forward-facing mouth or slot 54 formed therein and a lower lip 56, best seen in FIGS. 7 through 10. The hook mouth 54 is adapted for selectively engaging a forward striker 58 that is adapted to be fixedly secured to the floor 14. The forward striker 58 defines a laterally extending axis that is coaxial with the second pivot axis 44.

Figure 7:
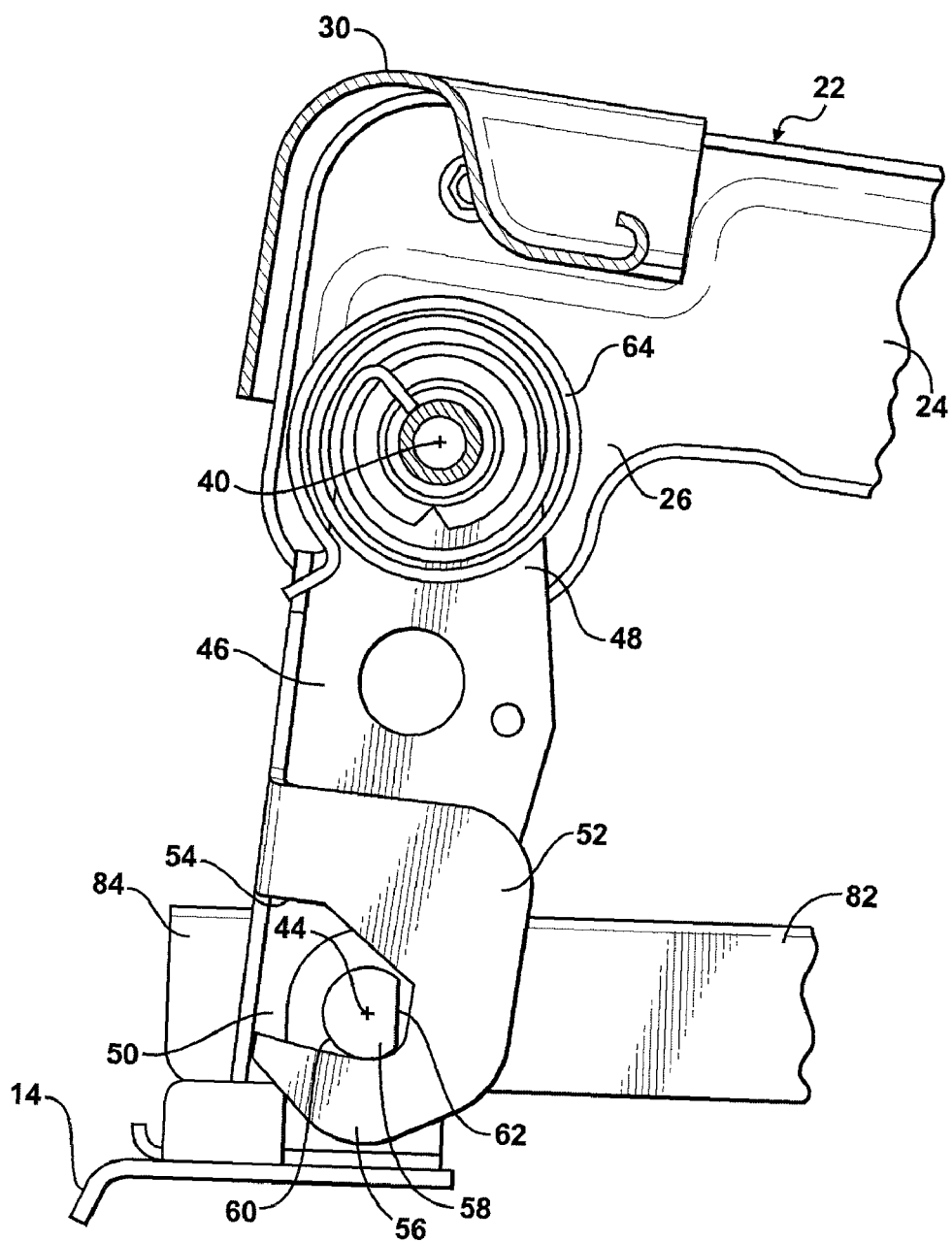
FIG. 7 is an enlarged, cross-sectional side view of a hook engaging a forward striker when the seat assembly is in the seating position.

The forward striker 58 has a cross-sectional profile that is generally D-shaped. The D-shaped profile is oriented such that a rounded front portion 60 of the D faces towards the forward end 16 of the seat cushion 12 and a straight back portion 62 of the D faces towards the rearward end 18 of the seat cushion 12. When the seat assembly 10 is in the seating position, as shown in FIG. 7, the forward striker 58 is disposed within the mouth 54 of the hook 52. The lower lip 56 of the hook 52 is designed to have a certain amount of interference with the rounded front portion 60 of the forward striker 58 when the seat assembly 10 is in the seating position such that the hook 52 cinches or pulls down on the inner front link 46, which in turn eliminates any looseness in the pivotal connections of the seat assembly 10, thereby effectively preventing any buzz, squeak, or rattle issues. The hook 52 holds the forward end 16 of the seat cushion 12 down during upward load conditions. Additionally, the hook 52 transfers forward and downward forces imparted to the seat assembly 10 to the forward striker 58.

Figure 8:
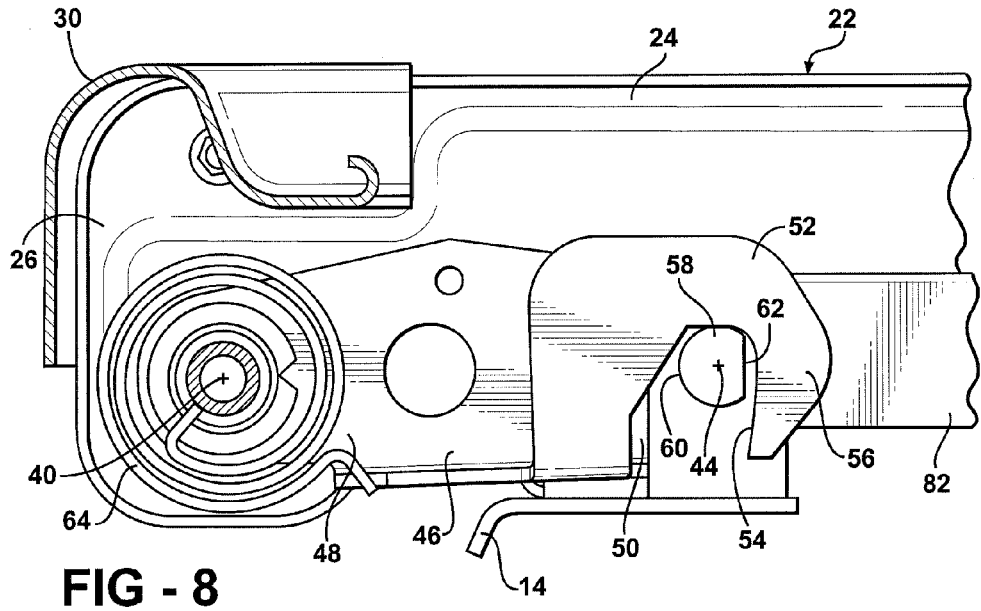
FIG. 8 is an enlarged, cross-sectional side view of the hook and the forward striker when the seat assembly is in the kneel position.
Figure 9:
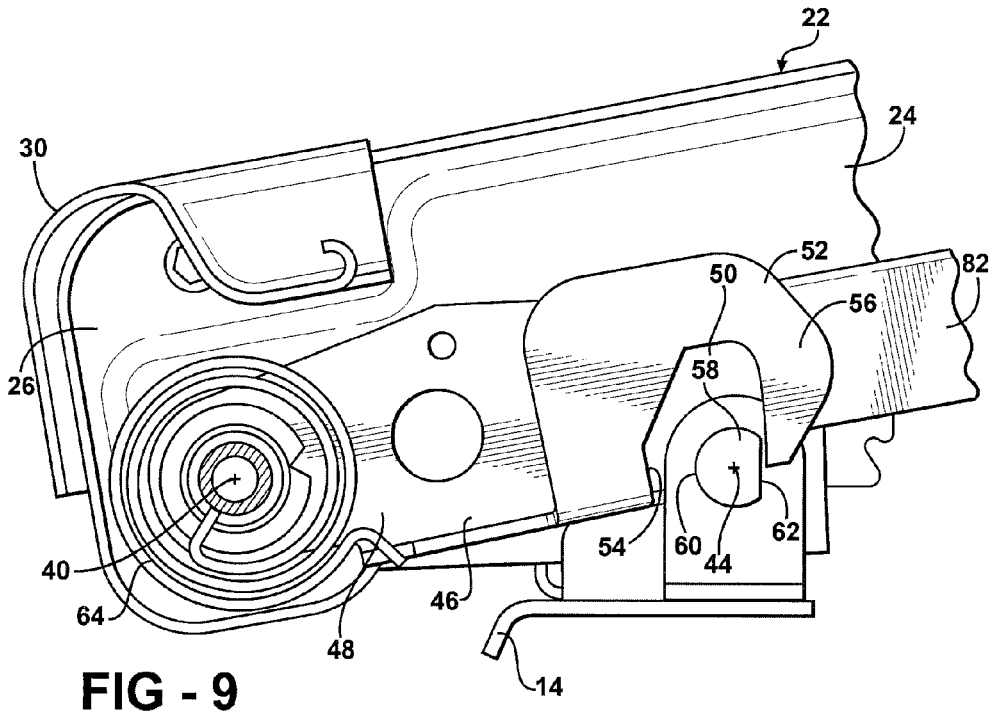
FIG. 9 is an enlarged, cross-sectional side view of the hook releasing from the forward striker as the seat assembly moves between the kneel position and the tumble position.
Figure 10:
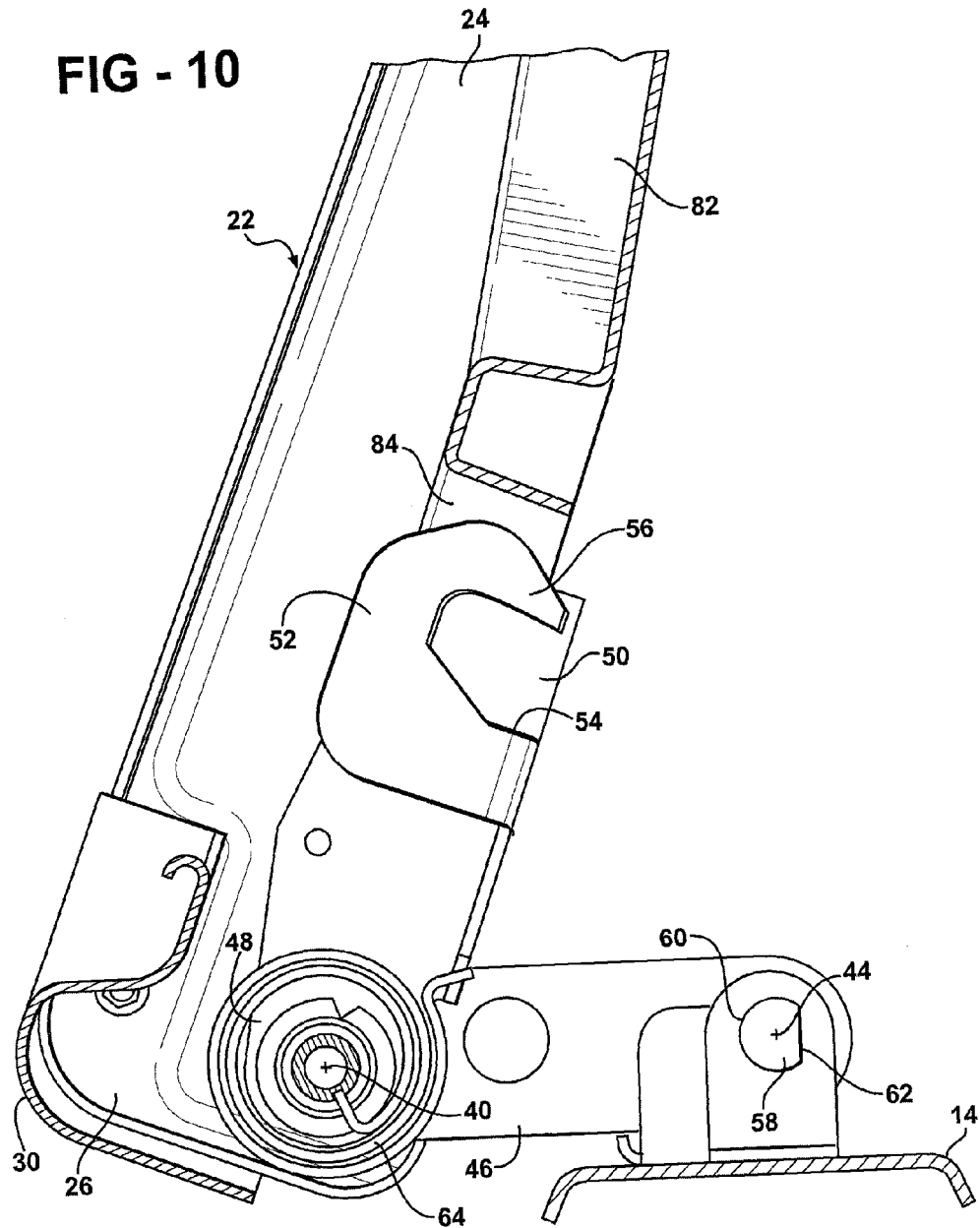
FIG. 10 is an enlarged, cross-sectional side view of the hook and the forward striker when the seat assembly is in the tumble position.

When the seat assembly 10 is in the kneel position, as shown in FIG. 8, the lower lip 56 of the hook 52 is disposed parallel to the straight back portion 62 of the forward striker 58 such that there is no interference therebetween. Thus, the hook 52 will release from the forward striker 58, as shown in FIG. 9, to allow the seat assembly 10 to pivot about the first pivot axis 40 from the kneel position, shown in FIG. 8, to the tumble position, shown in FIG. 10, as is described below in more detail.

A spring 64 is disposed about the pivotal connection between the upper end 48 of the inner front link 46 and the front member 30 of the seat cushion frame 22. One end of the spring 64 engages the seat cushion frame 22 and another end of the spring 64 engages the front link 46. The spring 64 biases the seat assembly 10 from the kneel position to the tumble position.

A pair of laterally spaced apart seat back brackets 66 are provided for supporting the seat back 20. Each seat back bracket 66 includes an upper portion 68 and a lower portion 70. A seat latch mechanism 72 is disposed between the upper portion 68 of each seat back bracket 66 and the corresponding side member 34 of the seat back frame 32. The seat latch mechanisms 72 actuate between a locked state and an unlocked state for controlling pivotal movement of the seat back 20 relative to the seat cushion 12. Normally, the seat latch mechanisms 72 are in the locked state to maintain the seat back 20 in the generally vertical position. In the unlocked state, the seat latch mechanisms 72 allow the seat back 20 to pivot to the forwardly folded position. It is appreciated that any suitable latching mechanism that is capable of locking and unlocking to control the pivotal movement of the seat back 20 may be used without varying from the scope of the art. A cross-talk tube 74 extends between the seat latch mechanisms 72 for simultaneous actuation of the seat latch mechanisms 72 between the locked and unlocked states and defining a pivot axis 88 between the seat back 20 and the seat back bracket 66. It is contemplated that only one seat latch mechanism 72 is necessary for controlling such pivotal movement of the seat back 20 while the pivotal connection on the other side of the seat assembly 10 may be a simple pivot connection between the side member 34 of the seat back frame 32 and the upper portion 68 of the seat back bracket 66.

The lower portion 70 of each seat back bracket 66 is adapted for releasably securing the seat assembly 10 to the floor 14. More specifically, the lower portion 70 of each seat back bracket 66 includes a floor latch mechanism 76 for releasably securing the seat assembly 10 to the floor 14. The floor latch mechanisms 76 actuate simultaneously between a latched state and an unlatched state. In the latched state, the floor latch mechanisms 76 are engaged with rearward strikers 78 that are adapted to be mounted to the floor 14 for maintaining the seat assembly 10 in the seating position. The floor latch mechanisms 76 remain engaged with the rearward strikers 78 as the seat assembly 10 moves between the seating position and the kneel position. In the unlatched state, the floor latch mechanisms 76 are disengaged from the rearward strikers 78 to allow the seat assembly 10 to pivot about the first pivot axis 40 between the kneel position and the tumble position. It is contemplated that only one floor latch mechanism 76 is required for latching and unlatching the seat assembly 10 to the floor 14.

A rear support tube 80 extends laterally between the pair of spaced apart seat back brackets 66. Each end of the rear support tube 80 is fixedly secured to the corresponding seat back bracket 66, between the upper 68 and lower 70 portions thereof. The rear support tube 80 provides added structural stability to the seat assembly 10. Additionally, a drive link 82 is aligned laterally with the inner front link 46 and extends non-linearly between the rear support tube 80 and the inner front link 46 for providing stability as the seat assembly 10 moves between the kneel position and the tumble position. More specifically, the drive link 82 extends between a forward end 84 and a rearward end 86. The forward end 84 of the drive link 82 is pivotally coupled to the lower end 50 of the inner front link 46 at 87, best seen in FIGS. 1 and 5. The rearward end 86 of the drive link 82 is fixedly secured to the rear support tube 80. The inner front link 46 and the drive link 82 are generally linearly aligned when the seat assembly 10 is in the kneel position, as shown in FIG. 4, and when the seat assembly 10 is in the tumble position, as shown in FIG. 6.

In operation, beginning with the seat assembly 10 in the seating position shown in FIG. 2, the seat latch mechanisms 72 are actuated from the locked state to the unlocked state such that the seat back 20 is free to pivot from the generally upright position to the forwardly folded position, overlying the seat cushion 12. As the seat back 20 pivots about the pivot axis 88 and moves from the generally upright position to the forwardly folded position, the seat back 20 urges the seat cushion 12 forward and downward. More specifically, the side members 34 of the seat back frame 32 push forwardly on the side members 24 of the seat cushion frame 22 via the pivotal interconnecting at pivot 35 which is spaced about the pivot axis 88. As the seat cushion 12 moves forward and downward, the outer front legs 36 and the inner front link 46 pivot in a counterclockwise direction (when viewed from FIG. 2) about the second pivot axis 44 to lower the seat assembly 10 downwardly adjacent to the vehicle floor 14. The seat assembly 10 is now in the kneel position, shown in FIGS. 3 and 4, with the seat back 20 overlying the seat cushion 12 and the seat cushion 12 in the generally horizontal lowered position, lying adjacent the floor 14. In the kneel position, the lower lip 56 of the hook 52 is released from the rounded front portion 60 of the forward striker 58 and is disposed parallel to the straight back portion 62 thereof, such that there is no interference between the hook 52 and the forward striker 58.

To move the seat assembly 10 from the kneel position to the tumble position, the floor latch mechanisms 76 are actuated from the latched state to the unlatched state to disengage from the rearward strikers 78. The seat assembly 10 is now free to pivot in the counterclockwise direction (when viewed from FIG. 4) about the first pivot axis 40. More specifically, with the outer front legs 36 and inner front link 46 resting parallel against the vehicle floor 14 and the hook 52 rotated and released from the striker 58, the seat assembly 10 pivots about the first pivot axis 40 until the seat cushion 12 is in the generally vertical position with the rearward end 18 positioned above the forward end 16, as shown in FIGS. 5 and 6. The seat assembly 10 may be returned from the tumble position to the kneel position by simply pivoting the seat assembly about the first pivot axis 40 in the opposite, or clockwise direction, as shown, until the striker 58 is received in the slot 54 of the hook 52 and the floor latch mechanism 76 is engaged with the rearward strikers 78.

Finally, the seat assembly 10 may be returned from the kneel position to the seating position by pivoting the seat back 20 upwardly and rearwardly, in the clockwise direction as shown, about the pivot axis 88. The side members 34 of the seat back frame 32 pull on the side members 24 of the seat cushion frame 22 and forcing the outer front legs 36 and inner front link 46 to pivot about the second pivot axis 44 and raise the seat cushion 12 above the floor 14. As the seat back 20 and seat cushion 12 return to the seating position, the hook 52 reengages with the striker 58 such that the lower lip 56 is interference fit and engaged with the rounded front portion 60 of the striker 58 again providing the load support between the seat assembly 10 and the vehicle floor 14.

The invention has been described here in an illustrative manner, and it is to be understood that the terminology used is intended to be in the nature of words of description rather than limitation. Many modifications and variations of the present invention are possible in light of the above teachings. It is, therefore, to be understood that within the scope of the appended claims, the invention may be practiced other than as specifically enumerated within the description.

What is claimed:

1. A seat assembly for supporting an occupant above a floor in an automotive vehicle, said seat assembly comprising:
    a seat cushion including at least one front leg pivotally coupled between said seat cushion and the floor defining upper and lower pivot axes for moving said seat cushion between a first generally horizontal position raised above the floor, a second generally horizontal position lowered adjacent the floor, and a generally vertical position;
    a seat back pivotally coupled to said seat cushion;
    a front link extending between an upper end pivotally coupled to said seat cushion about said upper pivot axis and a lower end pivotally coupled to the floor about said lower pivot axis and having a hook adapted for selective engagement with the floor; and
    wherein said hook is engaged with the floor about said lower pivot axis with said seat cushion in said first horizontal position and automatically released from the floor in response to movement of said seat cushion to said second horizontal position to allow pivotal movement of said seat cushion about said upper pivot axis between said second horizontal position and said vertical position.

2. A seat assembly as set forth in claim 1 wherein said seat cushion extends between a forward end and a rearward end.

3. A seat assembly as set forth in claim 2 wherein said rearward end of said seat cushion is disposed above said forward end of said seat cushion in said generally vertical position.

4. A seat assembly as set forth in claim 3 wherein said second generally horizontal position of said seat cushion is disposed forward and downward of said first generally horizontal position.

5. A seat assembly as set forth in claim 4 including a striker adapted to be fixedly mounted to the floor, wherein said hook is adapted for selectively engaging said striker.

6. A seat assembly as set forth in claim 5 including at least one seat back bracket extending between an upper portion and a lower portion, said upper portion operatively coupled to said seat back for allowing selective pivotal movement of said seat back between a generally upright position and a forwardly folded position overlying said seat cushion, said lower portion releasably coupled to the floor.

7. A seat assembly as set forth in claim 6 wherein said seat cushion includes a seat cushion frame having a pair of spaced apart side members extending between a forward end interconnected by a front cross member and a rearward end, and said seat back includes a seat back frame having a pair of side members having a lower end pivotally coupled to said upper portion of said seat back bracket and an upper end pivotally coupled to said rearward end of said side members.

8. A seat assembly as set forth in claim 7 including a pivot pivotally connecting said side members of said seat cushion frame and said upper portion of said seat back bracket for automatically translating said seat cushion from said first horizontal position to said second horizontal position in response to pivotal movement of said seat back from said upright position to said forwardly folded position.

9. A seat assembly as set forth in claim 8 wherein said hook includes a forward facing open slot for receiving said striker therein and a lower lip for engaging said striker when said seat cushion is in said first horizontal position to couple said seat assembly to the floor.

10. A seat assembly as set forth in claim 9 including a spring coupled between said seat cushion frame and said front link for biasing said seat cushion toward said vertical position.

11. A seat assembly as set forth in claim 10 including a seat latch mechanism coupled between said lower portion of said side members of said seat back frame and upper portion of said seat back bracket for selectively actuating between a locked state and an unlocked state allowing pivotal movement of said seat back relative to said seat cushion about a pivot axis.

12. A seat assembly as set forth in claim 11 including a floor latch mechanism coupled to said lower portion of said seat back bracket for selective engagement with the floor for releasably securing said seat assembly to the floor.

\* \* \* \* \*